United States Patent
Tanaka et al.

(10) Patent No.: US 11,307,519 B2
(45) Date of Patent: Apr. 19, 2022

(54) RECORDING MATERIAL COOLING DEVICE

(71) Applicant: CANON KABUSHIKI KAISHA, Tokyo (JP)

(72) Inventors: Kenichi Tanaka, Ibaraki (JP); Keita Kondo, Ibaraki (JP); Yuki Inoue, Ibaraki (JP); Shingo Katano, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/160,071

(22) Filed: Jan. 27, 2021

(65) Prior Publication Data
US 2021/0240114 A1     Aug. 5, 2021

(30) Foreign Application Priority Data

Jan. 30, 2020 (JP) .............................. JP2020-014114
Nov. 10, 2020 (JP) .............................. JP2020-187429

(51) Int. Cl.
*G03G 15/20* (2006.01)
*G03G 15/00* (2006.01)

(52) U.S. Cl.
CPC ..... *G03G 15/2021* (2013.01); *G03G 15/2017* (2013.01); *G03G 15/6573* (2013.01)

(58) Field of Classification Search
CPC ........... G03G 15/2021; G03G 15/2017; G03G 15/6573; G03G 21/206; G03G 2221/1615; G03G 2221/1624
(Continued)

(56) References Cited

U.S. PATENT DOCUMENTS 5,065,195 A * 11/1991 Haneda .............. G03G 15/0879
                                                        399/112
6,134,402 A * 10/2000 Nakayama ........... G03G 15/011
                                                        399/101
(Continued)

FOREIGN PATENT DOCUMENTS

JP       2009-181055       8/2009
JP       2010-002644       1/2010
(Continued)

OTHER PUBLICATIONS

U.S. Appl. No. 17/160,062, filed Jan. 27, 2021.
U.S. Appl. No. 17/236,787, filed Apr. 21, 2021.

*Primary Examiner* — Robert B Beatty
(74) *Attorney, Agent, or Firm* — Venable LLP

(57) ABSTRACT

A recording material cooling device includes a belt, a plurality of rollers, a belt cooling member, a recording material feeding member, a deposited matter removing member, a deposited matter receiving container, a roller holding member, and a supporting member for supporting the roller holding member so as to be swingable between a first position where the belt and the recording material feeding member contact each other and a second position where the belt is spaced from the recording material feeding member. The supporting member supports the roller holding member so that a swing center is positioned on one end side with respect to a rotational axis direction of the rollers. The receiving container includes a wall surface portion for preventing overflow of the deposited matter received through an opening of the receiving container when the roller holding member is positioned in the second position.

15 Claims, 9 Drawing Sheets

(58) Field of Classification Search
USPC .......................................................... 399/94
See application file for complete search history.

(56) References Cited

U.S. PATENT DOCUMENTS

| | | | |
|---|---|---|---|
| 8,655,242 B2 | 2/2014 | Tanaka | 399/323 |
| 8,942,612 B2 | 1/2015 | Tanaka | 399/330 |
| 9,025,991 B2* | 5/2015 | Namba | G03G 21/1623 |
| | | | 399/97 |
| 9,046,858 B2* | 6/2015 | Ikeda | G03G 15/6573 |
| 9,069,299 B2 | 6/2015 | Tanaka | G03G 15/2028 |
| 9,354,562 B2 | 5/2016 | Tanaka | G03G 15/2028 |
| 9,389,554 B2 | 7/2016 | Tanaka et al. | G03G 15/2021 |
| 9,465,336 B2 | 10/2016 | Saito et al. | G03G 15/2053 |
| 9,547,262 B2 | 1/2017 | Hirayama et al. | G03G 15/2039 |
| 9,563,163 B2 | 2/2017 | Tanaka et al. | G03G 15/502 |
| 10,061,242 B2 | 8/2018 | Tanaka | G03G 15/2032 |
| 10,564,576 B2 | 2/2020 | Tanaka et al. | G03G 15/2053 |
| 10,719,042 B2 | 7/2020 | Hirayama et al. | G03G 15/2039 |
| 2005/0207807 A1* | 9/2005 | Tombs | G03G 15/6585 |
| | | | 399/341 |
| 2017/0192387 A1 | 7/2017 | Tanaka | G03G 15/2039 |
| 2017/0242370 A1* | 8/2017 | Takenaga | G03G 15/161 |
| 2020/0363764 A1 | 11/2020 | Inoue et al. | G03G 15/6555 |
| 2020/0387093 A1* | 12/2020 | Hatazaki | G03G 15/2025 |
| 2021/0072699 A1 | 3/2021 | Inoue et al. | G03G 15/2017 |

FOREIGN PATENT DOCUMENTS

| | | |
|---|---|---|
| JP | 2015-094847 | 5/2015 |
| JP | 2017-173774 | 9/2017 |

* cited by examiner

Rear ←→ Front

Rear ←→ Front

RECORDING MATERIAL COOLING DEVICE

FIELD OF THE INVENTION AND RELATED ART

The present invention relates to an image forming a recording material cooling device, for cooling a recording material through a belt, suitable for use an image forming with apparatus, such as a printer, a copying machine, a facsimile machine or a multi-function machine, capable of forming an image by using an electrophotographic process.

In the image forming apparatus a toner image formed on a recording material such as paper is fixed on the recording material by being heated and pressed by a fixing device. Fixing of the toner image on the recording material is carried out by nipping and feeding the recording material by a fixing roller heated by a halogen heater or the like and by a pressing roller press-contacted to the fixing roller. When the toner image is fixed, the recording material is heated, and therefore, the recording material fed from the fixing device is liable to increase in temperature when compared with the recording material before fixing. Then, when the recording materials after the toner image is fixed are stacked on a stacking portion in a high-temperature state, there is a liability that the stacked recording materials stick to each other. In order to suppress such sticking of the recording materials, a recording material cooling device for lowering a temperature of the recording material after the fixing of the toner image is provided (Japanese Laid-Open Patent Application (JP-A) 2009-181055). The recording material cooling device disclosed in JP-A 2009-181055 is a device of a belt contact type, in which a belt for nipping and feeding the recording material fed from the fixing device is cooled by a heat sink, so that the temperature of the recording material is lowered through the belt.

As described above, in the case where the belt is cooled by the heat sink, in order to efficiently cool the belt, the belt is contacted to the heat sink in a state in which predetermined pressure is applied to the heat sink. Therefore, the rotating belt is abraded by the heat sink, so that abrasion powder of the belt can generate. This abrasion powder deposited on the belt and was carried together with paper powder or the like, as a deposited matter, and thus the deposited matter was liable to accumulate at an upstream end of the heat sink. Then, an amount of the deposited matter accumulated becomes large, and when a part of the deposited matter enters between the heat sink and the belt, a heat resistance is increased thereby, so that a recording material cooling performance can be lowered. Therefore, a cooling device provided with a cooling member such as a blade or a fur brush for removing the deposited matter including the abrasion powder of the belt generated by abrasion of the belt by the heat sink and provided with a case (receiving container) for receiving the deposited matter removed by the cooling member has been proposed (JP-A 2015-94847).

On the other hand, in the recording material cooling device, in order to facilitate removed of the recording material stagnating in a feeding nip of the recording material cooling device in the case where feeding abnormality of the recording material occurs or in the like case, a mechanism for swinging an upper unit including the belt in order to separate the belt from a feeding member for nipping and feeding the recording material in cooperation with the belt is provided in some instances.

In the case where the cooling device disclosed in JP-A 2015-94847 is applied to the above-described recording material cooling device in which the mechanism for swinging the upper unit is used, there is a liability that the deposited matter overflows from the case (receiving container) when the upper unit is rotated.

SUMMARY OF THE INVENTION

The present invention has been accomplished in view of the above-described problem. A principal object of the present invention is to provide a recording material cooling device of a belt cooling type in which a mechanism for swinging a belt relative to a feeding member for nipping and feeding a recording material in cooperation with the belt and capable of suppressing overflow of a deposited matter from a case (receiving container) when the belt is swung.

According to an aspect of the present invention, there is provided a to recording material cooling device for cooling a recording material passed through a fixing device for fixing a toner image on the recording material by heating, the recording material cooling device comprising: a belt; a plurality of rollers configured to stretch the belt; a cooling member configured to cool the belt in contact with an inner peripheral surface of the belt; a feeding member contacting an outer peripheral surface of the belt and configured to form a nip, in which the recording material is nipped and fed, in cooperation with the belt; a removing member configured to remove a deposited matter deposited on the inner peripheral surface of the belt; a receiving container provided with an opening the configured to receive the deposited matter removed by the removing member; a holding member configured to hold the rollers, the cooling member and the receiving container; and a supporting member configured to support the holding member so as to be swingable between a first position where the belt and the feeding member contact each other and a second position where the belt is spaced from the feeding member, wherein the supporting member supports the holding member so that a swing center is positioned on one end side with respect to a rotational axis direction of the rollers, wherein the receiving container includes a wall surface portion configured to prevent overflow of the deposited matter received through the opening when the holding member is positioned in the second position.

Further features of the present invention will become apparent from the following description of exemplary embodiments with reference to the attached drawings.

DESCRIPTION OF EMBODIMENTS

First Embodiment

[Image Forming System]

In the following, a recording material cooling device of this embodiment will be described.

First, a general structure of an image forming apparatus with which the recording material cooling device of this embodiment is suitably used will be described with reference to FIGS. 1 and 2. An image forming apparatus 100 is an electrophotographic full-color printer of a tandem type. The image forming apparatus 100 includes image forming portions PY, PM, PC and PK for forming images of yellow, magenta, cyan and black, respectively. The image forming apparatus 100 forms a toner image on a recording material S in response to an image signal sent from an original reading device (not shown) connected to an apparatus main assembly 100A or from an external device such a personal computer communicably connected to the apparatus main assembly 100A. As the recording material S, it is possible to use sheet materials of various kinds, such as sheets including plain paper, thick paper, roughened paper, uneven paper and coated paper; plastic films; and cloths.

Figure 1:
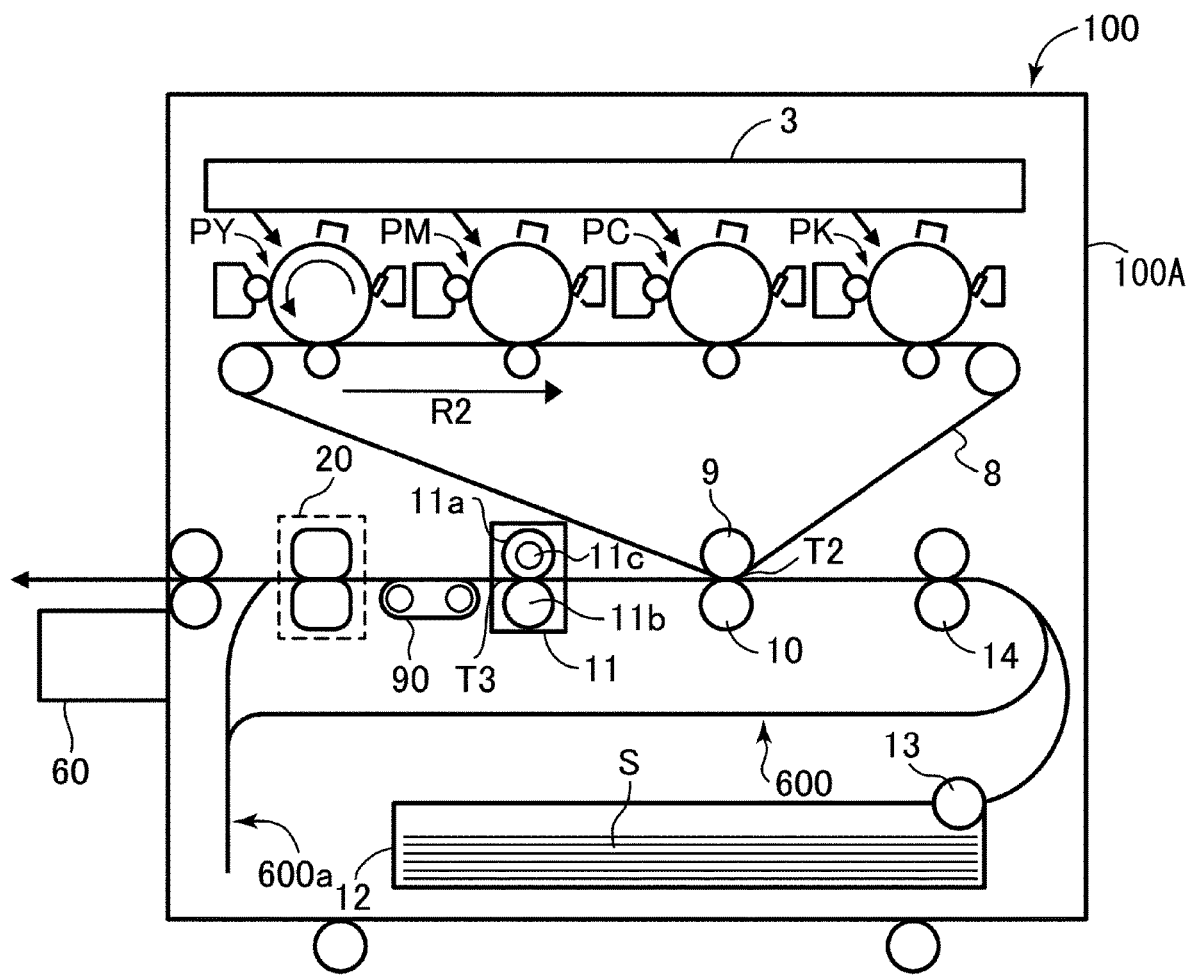
FIG. 1 is a schematic view showing a structure of an image forming apparatus according to a first embodiment of the present invention.

As shown in FIG. 1, the image forming portions PY, PM, PC and PK are juxtaposed along a movement direction of the intermediary transfer belt 8 in the apparatus main assembly 100A. The intermediary transfer belt 8 is constituted so as to be stretched by the plurality of rollers and to be moved (rotated) in an arrow R2 direction in the figure. The intermediary transfer belt 8 carries and feeds primary-transferred toner images. At a position opposing, through the intermediary transfer belt 8, a roller 9 stretching the intermediary transfer belt 8, a secondary transfer roller 10 is disposed, so that a secondary transfer portion T2 where the toner images on the intermediary transfer belt 8 are transferred onto the recording material S is formed. On a side downstream of the secondary transfer portion T2 with respect to a recording material feeding direction, a fixing device 11 is provided. Further, on a side downstream of the fixing device 11 with respect to the recording material feeding direction, a feeding device 90 and a recording material cooling device 20 are provided in a named order from an upstream side.

At a lower portion of the image forming apparatus 100, a cassette 12 in which recording materials S are accommodated. The recording material S is fed from the cassette 12 toward a registration roller pair 14 by a feeding roller 13 along a feeding passage 600 forming a path of the recording material S in the apparatus main assembly 100A. Thereafter, the registration roller pair 14 is started to be rotated in synchronism with the toner images formed on the intermediary transfer belt 8, so that the recording material S is fed toward the secondary transfer portion T2 along the feeding passage 600.

Incidentally, in this embodiment, only one cassette 12 is shown, but a plurality of cassettes 12 capable of accommodating the recording materials different in size and thickness may also be provided, and in that case, the recording material S is selectively fed from either one of the plurality of cassettes 12 to the feeding passage 600. Further, the recording material S is not limited to the recording material S accommodated in the cassette 12, but the recording material S stacked on a manual feeding portion (not shown) may also be fed to the feeding passage 600.

[Image Forming Portion]

The four image forming portions PY, PM, PC and PK included in the image forming apparatus 100 have the substantially same constitution except that development colors are different from each other. Accordingly, in this embodiment, as a representative, the image forming portion PK will be described, and other image forming portions PY, PM and PC will be omitted from description.

Figure 2:
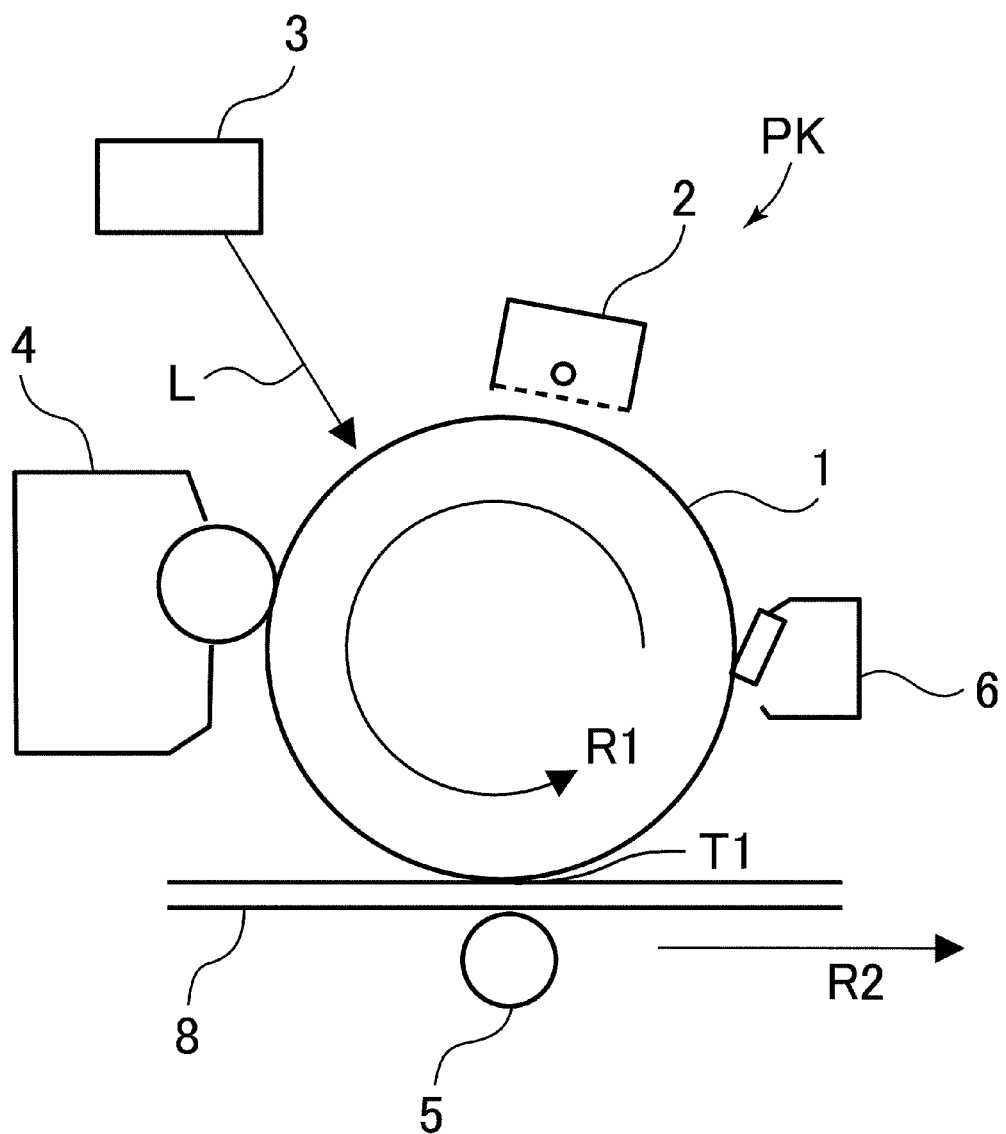
FIG. 2 is a schematic view showing an image forming portion.

As shown in FIG. 2, in the image forming portion PK, a cylindrical photosensitive drum 1 is provided as a photo-sensitive member. The photosensitive drum 1 is rotationally driven in an arrow R1 direction in the figure. At a periphery of the photosensitive drum 1, a charging device 2, an exposure device 3, a developing device 4, a primary transfer roller 5 and a drum cleaning device 6 are provided.

A process for forming, for example, a full-color image by the image forming apparatus 100 will be described. First, when an image forming operation is started, a surface of the rotating photosensitive drum 1 is electrically charged uniformly by the charging device 2. The charging device 2 is a corona charger or the like for charging the photosensitive drum 1 to a uniform negative dark-portion potential by irradiating the photosensitive drum 1 with charge particles with corona discharge, for example. Then, the photosensitive drum 1 is subjected to scanning exposure to laser light L which is emitted from the exposure device 3 and which corresponds to an image signal. By this, an electrostatic latent image depending on the image signal is formed on the surface of the photosensitive drum 1. The electrostatic latent image formed on the photosensitive drum 1 is visualized (developed) into a visible image by toner (developer) accommodated in the developing device 4.

The resultant toner image formed on the photosensitive drum 1 is primary-transferred onto the intermediary transfer belt 8 at a primary transfer portion T1 formed between the intermediary transfer belt 8 and the photosensitive drum 1 opposing the primary transfer roller 5. At this time, to the primary transfer roller 5, a primary transfer bias (voltage) is applied. After the primary transfer, toner remaining on the surface of the photosensitive drum 1 is removed by the drum cleaning device 6.

Returning to FIG. 1, the above-described operation is sequentially performed in the image forming portions PY, PM, PC and PK for yellow, magenta, cyan and black, respectively, so that four color toner images are superposed on the intermediary transfer belt 8. Thereafter, in synchronism with toner image forming timings, the recording material S accommodated in the cassette 12 is fed to the secondary transfer portion T2. Then, by applying a secondary transfer bias (voltage) to the secondary transfer roller 10, the toner images for a full-color image are collectively secondary-transferred onto the recording material S.

Then, the recording material S is fed toward the fixing device 11. The fixing device 11 includes a fixing roller 11a provided rotatably and a pressing roller 11*b* rotating while being press-contacted to the fixing roller 11*a*. In a state in which the pressing roller 11*b* is press-contacted to the fixing roller 11*a* (for example, about 784 N (about 80 kgf) in press-contact force), the fixing roller 11*a* is rotated at a predetermined rotational speed (for example, 400 mm/sec) by an unshown driving motor. Inside the fixing roller 11*a*, a halogen heater 11*c* is provided, and by the halogen heater, a surface temperature of the fixing roller 11*a* is increased (for example, 180° C.), so that the fixing device 11 is capable of heating the recording material S.

Figure 3:
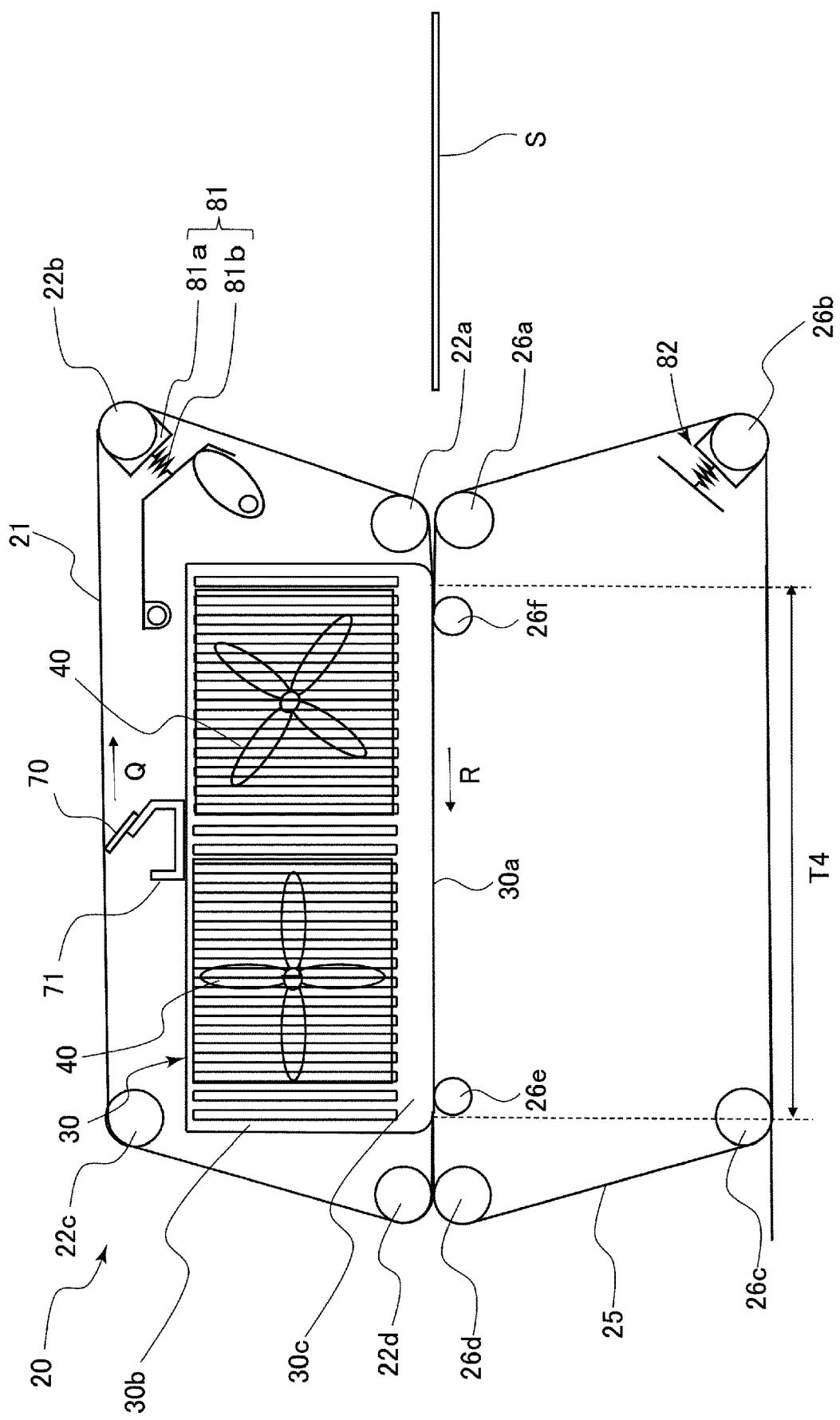
FIG. 3 is a schematic view showing a recording material cooling device of the first embodiment.
Figure 4A:
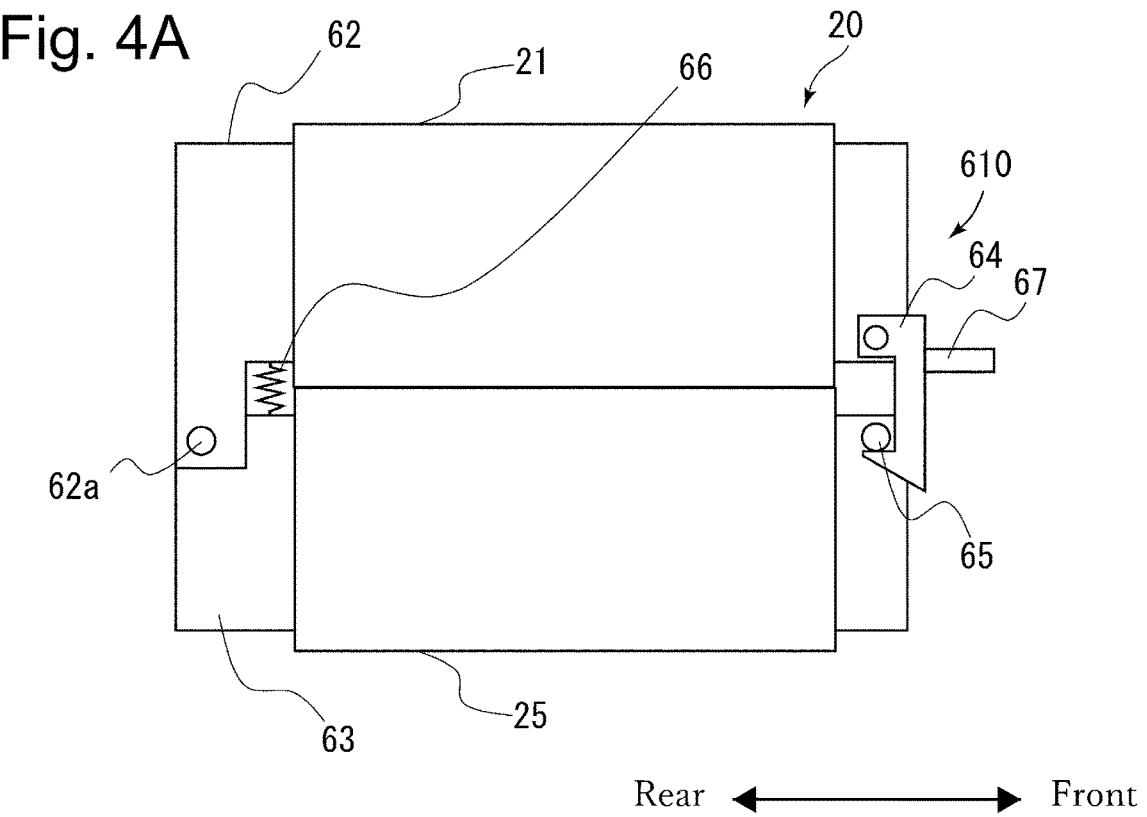
FIG. 4A is a schematic view showing a contact state of a belt.
Figure 4B:
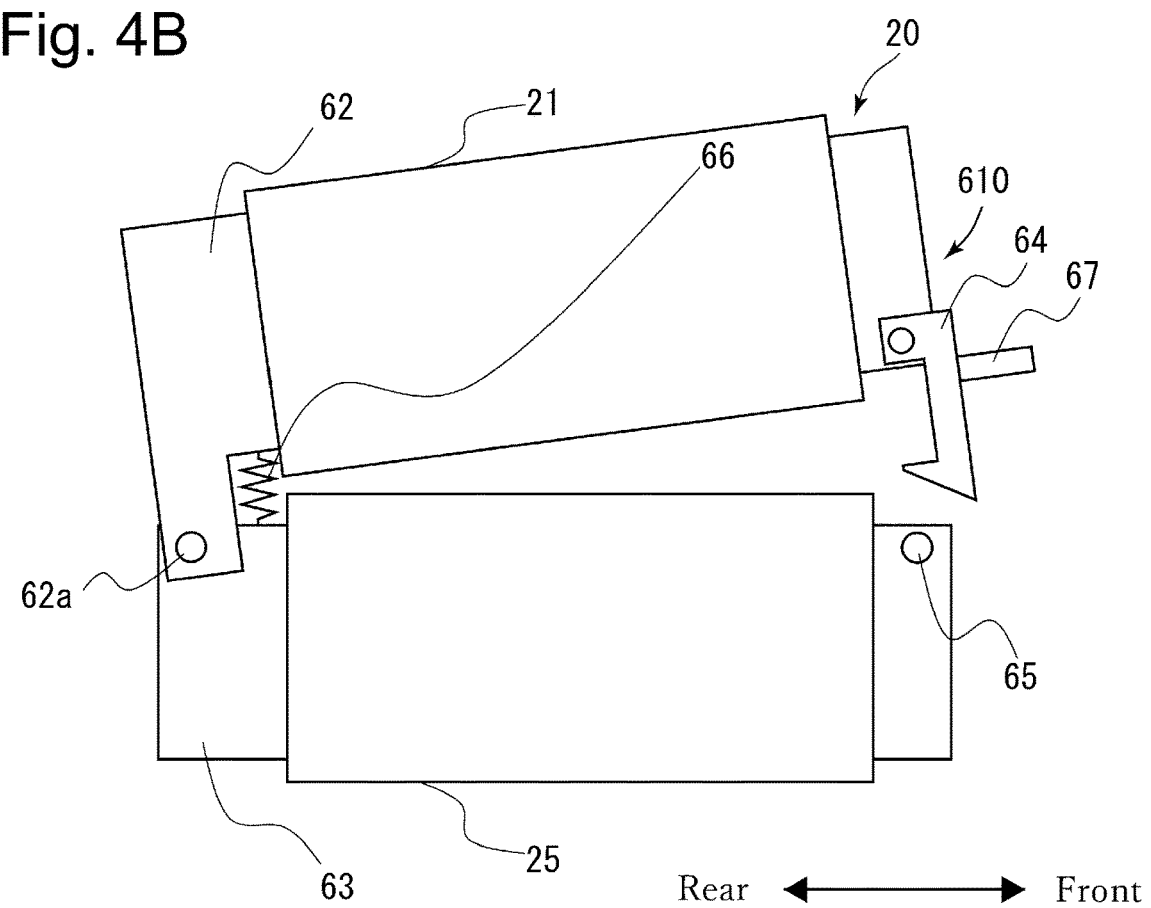
FIG. 4B is a schematic view showing a separated state of the belt.

At a fixing nip T3 formed by the fixing roller 11*a* and the pressing roller 11*b*, the fixing device 11 nips and feeds the recording material S on which the full-color toner image is formed and thus heats and presses the fed recording material S, so that the full-color toner image is fixed on the recording material S. That is, the toners of the full-color toner image formed on the recording material S are melted and mixed by heating and pressing, and are fixed as a full-color image on the recording material S. Thus, a series of operations of the image forming process is ended. Then, the recording material S on which the toner image is fixed is fed toward the recording material cooling device 20 by the feeding device 90. The feeding device 90 feeds the recording material S from the fixing device 11 to the recording material cooling device 20 by rotating a belt, for carrying the recording material S through, for example, air suction or the like, at a predetermined rotational speed (for example, 400 mm/s). The recording material cooling device 20 cools the recording material S fed by the feeding device 90. A temperature of the recording material S is, for example, about 90° C. before being cooled by the recording material cooling device 20, but is lowered to about 60° C. by the recording material cooling device 20. The recording material cooling device 20 will be described later (FIG. 3 to FIG. 4B).

Incidentally, in the case of this embodiment, the feeding passage 600 includes a reverse feeding portion 600*a* in which for the purpose of double-side printing, the recording material S cooled by the recording material cooling device 20 is turned upside down and then is fed again to the image forming portions PY, PM, PC and PK. That is, in the case of one-side printing, the recording material S on which first surface (front surface) the toner image is fixed is cooled by the recording material cooling device 20 and thereafter is discharged to an outside of the image forming apparatus 100 and is stacked on a stacking unit 60. On the other hand, in the case of the double-side printing, the recording material S on which first surface (front surface) the image is fixed is cooled by the recording material cooling device 20, and thereafter is turned upside down by the reverse feeding portion 600*a*. Then, the recording material S is fed along the feeding passage 600, and thereafter, the toner image is formed and fixed on a second surface (back surface). The recording material S on which second surface the toner image is fixed is cooled by the recording material cooling device 20, and thereafter is discharged to the outside of the image forming apparatus 100, so that the recording material S is stacked on the stacking unit 60.

[Recording Material Cooling Device]

Next, the recording material cooling device 20 of this embodiment will be described using FIG. 3 to FIG. 4B. The recording material cooling device 20 of this embodiment is a cooling device of a belt cooling type. As shown in FIG. 3, the recording material cooling device 20 includes an endless first belt 21 and endless second belt 25 for nipping and feeding the recording material S in cooperation with the first belt 21. Each of the first belt 21 and the second belt 25 is an endless belt which is formed of a polyimide resin material high in strength so as to have a thickness of 100 μm and a peripheral length of 942 mm, for example.

As shown in FIG. 3, the first belt 21 is stretched by first belt stretching rollers 22*a* to 22*d*, and at least one of the first belt stretching rollers 22*a* to 22*d* is rotated by an unshown driving motor. In the case of this embodiment, for example, the roller 22*d* is rotated by the unshown driving motor, so that the first belt 21 is moved in an arrow Q direction in the figure. The roller 22*d* as a driving roller includes, for example, a 1 mm-thick rubber layer as a surface layer, and is formed with an outer diameter of 40 mm, for example.

The roller 22*b* as a second roller is a steering roller which is provided so as to be capable of stretching the first belt in cooperation with the roller 22*c* as a first roller in contact with an inner peripheral surface of the first belt and which controls a shift of the first belt in a widthwise direction of the first belt (widthwise direction of the roller 22*c*). The roller 22*b* includes a 1 mm-thick rubber layer as a surface layer, and is capable of controlling meandering of the first belt by performing a steering operation for forming a rudder angle relative to the roller 22*c* as the first roller. The roller 22*b* is subjected to the steering operation by a steering mechanism portion 81. The steering mechanism portion 81 holds a roller holder 81*a* swingable about a widthwise central portion thereof as a swing center while holding the roller 22*b* and holds a spring 81*b* as an urging means for urging the roller 22*b*, held by the roller holder 81*a*, toward the first belt 21. For example, the roller holder 81*a* includes a bearing (not shown) for shaft-supporting a rotation shaft of the roller 22*b*, and the bearing is urged by the spring 81*b*. This spring 81*b* is spring pressure-fixed one capable of urging the roller 22*b* with an urging force such that tension of the first belt 21 is about 39.2 N (about 4 kgf). Further, the roller holder 81*a* is held so as to be swingable about a swing center axis crossing a rotational axis of the roller 22*b*.

On an inner peripheral surface side of the first belt 21, in addition to the above-described plurality of first stretching rollers 22*a* to 22*d* and the steering mechanism portion 81, a heat sink 30, a scraper 70 and a collecting box 71 are provided. The heat sink 30, the scraper 70 and the collecting box 71 will be described later.

On the other hand, the second belt 25 as a feeding member (belt-shaped member) is stretched by a plurality of second belt stretching rollers 26*a* to 26*d* and is contacted to an outer peripheral surface of the first belt 21. In the case of this embodiment, the second belt 25 is contacted to the first belt 21 from below with respect to the direction of gravitation. The second belt 25 contacts the outer peripheral surface of the first belt 21 and forms a cooling nip T4 for cooling the recording material S, on which the toner image is formed, while feeding the recording material S. In the case of this embodiment, the roller 26*d* is pressed by the roller 22*d* at pressure of, for example, about 49 N (about 6 kgf). Further, the roller 26*d* is connected to a driving motor for driving the roller 22*d* through driving gears although the driving motor is omitted from illustration, and is rotated by this driving motor, so that the second belt 25 is moved in an arrow R direction. That is, the second belt 25 is moved (rotated) together with the first belt 21. The roller 26*b* is a steering roller for controlling a shift of the second belt 25 with respect to the widthwise direction (rotational axis direction of the roller 26*c*), and controls meandering of the second belt 25 by performing a steering operation for forming a rudder angle relative to the roller 26*c* at a widthwise central portion as a swing center. That is, the roller 26*b* is subjected to the steering operation by a steering mechanism portion 82 similar to the above-described steering mechanism portion 81.

On an inner peripheral surface side of the second belt 25, a plurality of pressing rollers are provided for pressing the second belt 25 toward the heat sink 30 which is provided on the inner peripheral surface side of the first belt 21 and which is described later. In this embodiment, as an example, with respect to a recording material feeding direction (the arrow direction in FIG. 3), a pressing roller 26e is provided on a downstream side of the cooling nip T4 and a pressing roller 26f is provided on an upstream side of the cooling nip T4. These pressing rollers 26e and 26f press the second belt 25 at pressure of, for example, 9.8 N (1 kgf), so that the first belt 21 is contacted to the heat sink 30 with reliability by the pressing rollers 26e and 26f through the second belt 25.

Incidentally, in this embodiment, the example in which both the first belt 21 and the second belt 25 are driven was described, but the present invention is not limited thereto. For example, only the first belt 21 is driven and the second belt 25 may also be driven by the first belt 21, or only the second belt 25 is driven and the first belt 21 may also be driven by the second belt 25.

[Heat Sink]

On the inner peripheral surface side of the first belt 21, the heat sink 30 for cooling the first belt 21 is provided. In the case of this embodiment, the heat sink 30 is contacted to the inner peripheral surface of the first belt 21 contacting the recording material S on a side where the toner image is fixed on the recording material S by the fixing device 11. That is, the recording material S on which the toner image is fixed is nipped by the first belt 21 and the second belt 25 and is fed in a recording material feeding direction (arrow R direction in the figure) in accordance with circulatory movement of these belts. During the feeding, the recording material S passes through the cooling nip T4 as a nip formed by contact between the first belt 21 and the second belt 25. In the case of this embodiment, in the cooling nip T4, the first belt 21 is cooled by the heat sink 30. In order to efficiently cool the recording material S, the heat sink 30 contacts the inner peripheral surface of the first belt 21 at a place where the plurality of first belt stretching rollers 22a to 22d stretch the first belt 21 and thus form the cooling nip T4. When the recording material S passes through the cooling nip T4, the recording material S is lowered in temperature through the first belt 21 cooled by the heat sink 30.

The heat sink 30 as a cooling member is radiator (dissipator) plate formed of metal such as aluminum. The heat sink 30 includes a heat receiving portion 30a for taking heat from the first belt 21 in contact with the first belt 21, a heat radiating (dissipating) portion 30b for radiating (dissipating) heat, and a fin base 30c for transferring the heat from the heat receiving portion 30a to the heat radiating portion 30b. The heat radiating portion 30b is formed with many heat radiating fins in order to promote efficient radiation by increasing a contact area to the air. For example, the heat radiating fins are set at 1 mm in thickness, 100 mm in height and 5 mm in pitch, and the fin base 30c is set at 10 mm in thickness. Further, in order to forcedly cool the heat sink 30 itself, a cooling fan 40 sending the air toward the heat sink 30 (specifically the heat radiating portion 30b) is provided. An air flow rate of the cooling fan 40 is set at, for example, 2 $m^3$/min.

[Scraper]

Further, on the inner peripheral surface side of the first belt 21, the scraper 70 as a removing member is provided on a side downstream of the heat sink 30 with respect to the movement direction (arrow Q direction in FIG. 3) of the first belt 21. In the case of this embodiment, the scraper 70 is provided in a position downstream of the roller 22c and upstream of the roller 22b with respect to the movement direction of the first belt 21. The scraper 70 is, for example, a film-like sheet member formed of, for example, a 0.1 mm-thick PET sheet in a length such that the scraper 70 the first belt 21 over at least a range in which the recording material S passes with respect to the widthwise direction of the first belt 21 perpendicular to a thickness direction and a rotational direction of the first belt 21. The scraper 70 is disposed so as to contact the first belt 21 from a counterdirection to the movement direction of the first belt 21. Such a scraper 70 has flexibility, so that the scraper 70 is capable of maintaining a state of contact with the first belt 21 while following motion of the first belt 21 which moves (rotates).

The scraper 70 is provided so as to be capable of cleaning the first belt 21 by removing, from the first belt 21, a deposited matter containing abrasion powder, paper powder and the like, deposited on the first belt 21. That is, as described above, the heat sink 30 contacts the inner peripheral surface of the first belt 21, so that the inner peripheral surface of the first belt 21 is rubbed against the heat sink 30 with rotation of the first belt 21. Then, the first belt 21 is abraded by the heat sink 30, so that the abrasion powder (abraded powder) can generate. This above-described is carried, as the deposited matter, together with the paper powder and the like deposited on the first belt 21, and is liable to stagnate (accumulate) at an upstream end of the heat sink 30. Then, when an amount of the stagnated deposited matter increases, a part of the stagnated deposited matter enters between the heat sink 30 and the first belt 21, whereby a heat resistance increases and such a deposited matter is capable of lowering a cooling performance of the recording material S.

In order to suppress the generation of the above-described abrasion powder, as the first belt 21, for example, a belt formed of polyimide resin containing a polytetrafluoroethylene (PTFE) filler is used. A content of the PTFE filler is, for example, about 5% in terms of weight percentage. When the PTFE filler is contained in the polyimide resin which is a base material, a friction resistance with the heat sink 30 lowers, so that the first belt 21 containing the PTFE filler is not readily abraded by the heat sink 30 compared with the case where the PTFE filler is not contained in the first belt 21. However, even when the belt containing the PTFE filler is used, the abrasion powder of the belt can inevitably generate. This abrasion powder contains the PTFE filler, and therefore, does not readily deposit on the first belt 21, but even such abrasion powder can deposit on the first belt 21 when the abrasion powder passes through a sliding surface between the heat sink 30 and the first belt 21. Therefore, with a longer operation (use) time of the first belt 21, an amount of the deposited matter containing the abrasion powder stagnating at the upstream end of the heat sink becomes larger. Therefore, in order to remove the deposited matter, depositing on the first belt 21, from the first belt 21, as described above, the scraper 70 is disposed downstream of the heat sink 30 with respect to the rotational direction of the first belt 21.

Figure 5:
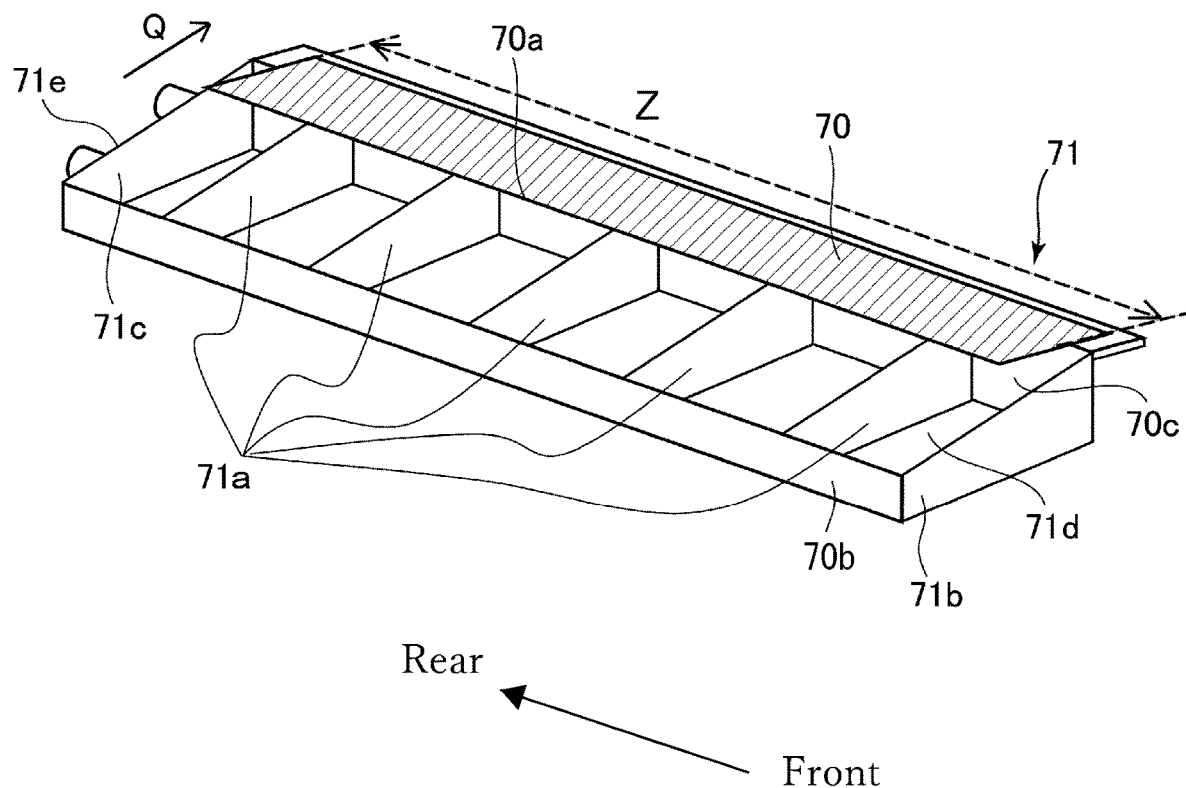
FIG. 5 is a perspective view of a collecting box in the first embodiment.
Figure 6A:
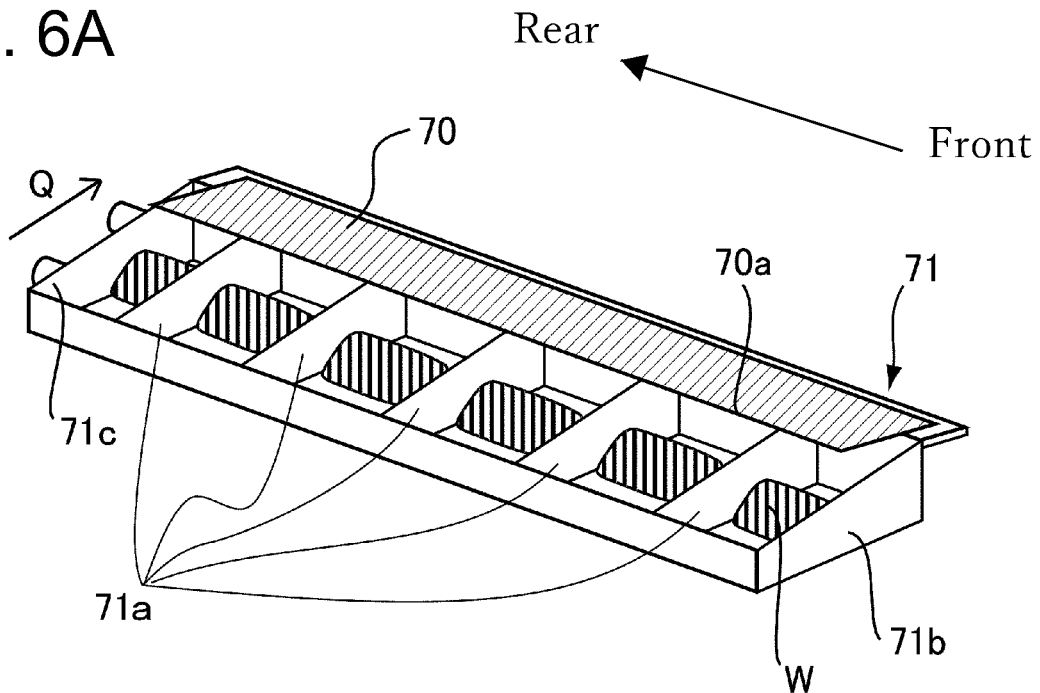
FIG. 6A is a perspective view showing a deposited state of a deposited matter in the collecting box under a condition 1.
Figure 6B:
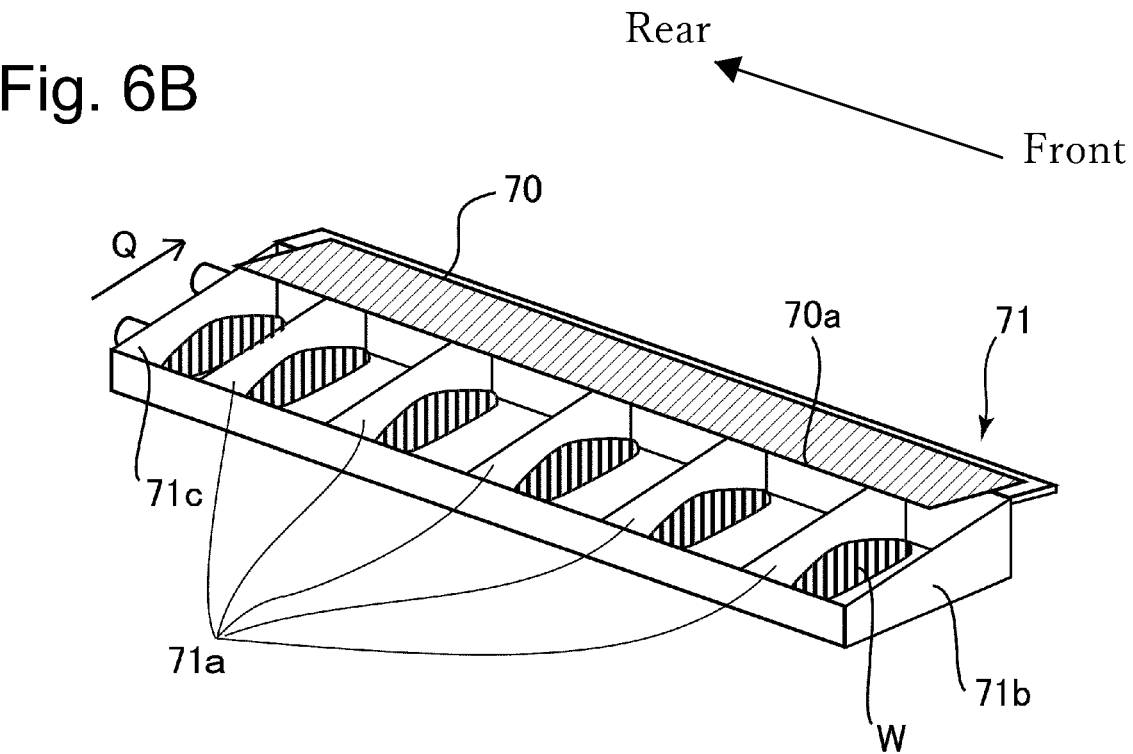
FIG. 6B is a perspective view showing a deposited state of the deposited matter in the collecting box under a condition 2.

Under the scraper 70 with respect to the direction of gravitation, the collecting box 71 for collecting the deposited matter scraped off from the first belt 21 by the scraper 70 is provided. The collecting box 71 opens upward with respect to the direction of gravitation, and is disposed so that the deposited matter can be received through an opening thereof even on a side upstream of the first belt 21 with respect to the movement direction than a contact portion between the scraper 70 and the first belt 21 is. The collecting box 71 will be specifically described later (FIG. 5 to FIG. 6B). Incidentally, the scraper 70 is fixed to the collecting box 71 with, for example, a double-side tape or the like.

The above-described first belt 21 is worn by being abraded by the heat sink 30 as described above, and can deteriorate with time. Further, the second belt 25 provided with no heat sink 30 is slowly worn compared with the first belt 21 but is worn with use, and an deteriorate with time. Therefore, in order to permit an operator to exchange the first belt 21 and/or the second belt 25, the first belt 21 and the second belt 25 are provided so as to be capable of being inserted into and extracted from an upper frame 62 and a lower frame 63 (FIG. 4A, FIG. 4B), respectively of the recording material cooling device 20. However, when the operator exchanges the first belt 21 and/or the second belt 25, in a contact state in which the first belt 21 and the second belt 25 are in contact with each other, the belt is not readily inserted into and extracted from the associated frame. Therefore, the first belt 21 and the second belt 25 are provided so as to be movable relative to each other in a manner such that these belts can be changed in state between the contact state and a separated (spaced) state in which the first belt 21 and the second belt 25 are separated (spaced) from each other.

[Contact-and-Separation Mechanism]

A mechanism for moving the first belt 21 and the second belt 25 relative to each other (this mechanism is referred to as a contact-and-separation mechanism) will be described. FIGS. 4A and 4B are schematic views of the recording material cooling device 20 seen from a downstream side in the recording material feeding direction. In the case of this embodiment, a contact-and-separation mechanism 610 is provided so as to be capable of swinging the upper frame 62, in which the scraper 70 and the collecting box 71 are provided, upward with respect to the direction of gravitation. The upper frame 62 is swung so that with respect to the widthwise direction, one end side (left(-hand) side in FIGS. 4A and 4B) is a swing center and the other end side (right(-hand) side in FIGS. 4A and 4B) is moved (rotated). In this embodiment, the contact-and-separation mechanism 610 which is a supporting portion is principally constituted by a swing shaft 62a, a hooking member 64, a pin 65 and a compression spring 66.

As shown in FIGS. 4A and 4B, the recording material cooling device 20 in this embodiment is roughly divided into the upper frame 62 and the lower frame 63. In these figures, the right side is a front side of the image forming apparatus 100 (recording material cooling device 20), and the left side is a rear side of the image forming apparatus 100 (recording material cooling device 20). The upper frame 62 as a holding member holds the above-described first belt stretching rollers 22a to 22d so as to be rotatable, and holds the heat sink 30 and the collecting box 71. The scraper 70 is held by the collecting box 71. On the other hand, the lower frame 63 holds the above-described second belt stretching rollers 26a to 26d and pressing rollers 26e and 26f These upper frame 62 and lower frame 63 are connected to each other so as to be swingable about the swing shaft 62a provided on one end side (rear side) with respect to the widthwise direction. The first belt 21 is provided so as to be capable of being inserted into and extracted from the upper frame 62 from the other end side with respect to the widthwise direction, and the second belt 25 is provided so as to be capable of being inserted into and extracted from the lower frame 63 from the other end side with respect to the widthwise direction (right side in FIG. 4B).

On the upper frames other end side (front side) of the upper frame 62 with respect to the widthwise direction, the hooking member 64 is provided, and on the other end side of the lower frame 63 with respect to the widthwise direction, the pin 65 is provided. On one end side of the lower frame 63 with respect to the widthwise direction, the compression spring 66 for urging the upper frame 62 upward with respect to the direction of gravitation is disposed. Further, the hooking portion 64 is provided with a grip portion 67, and the operator is capable of engaging the hooking member 64 with the pin 65 and is capable of disengaging the hooking member 64 from the pin 65 by rotating the hooking member 64 while gripping the grip portion 67 from the front side of the recording material cooling device 20. As shown in FIG. 4A, the hooking member 64 is engaged with the pin 65, so that the contact state in which the first belt 21 and the second belt 25 are in contact with each other is formed. The operator engages the hooking member 64 with the pin 65 by pressing the upper frame 62 toward the lower frame 63 against a spring force of the compression spring 66. Incidentally, the spring force of the compression spring 66 may only be required to be set at a value depending on a weight of the upper frame 62, and in the case of this embodiment, is set at a value at which the operator is capable of engaging the hooking member 64 with the pin 65 by a force of about 10 N.

In the case where the operator exchanges the first belt 21 or the second belt 25, the operator release engagement between the hooking member 64 and the pin 65. When the engagement between the hooking member 64 and the pin 65 is released, as shown in FIG. 4B, the upper frame 62 is swung so as to be raised by the compression spring 66. At this time, the first belt stretching rollers 22a to 22d, the first belt 21, the heat sink 30, the scraper 70 and the collecting box 71 are moved integrally with the upper frame 62. Then, the swing of the upper frame 62 is stopped by a stopper (not shown), and the upper frame 62 is positioned in a predetermined position. Thus, the upper frame 62 is swung relative to the lower frame 63, so that the first belt 21 and the second belt 25 are put in the separated state. In the case of this embodiment, the collecting box 71 is swung together with the upper frame 62, whereby the collecting box 71 is movable so as to be put in a state in which the collecting box 71 is not inclined with respect to the horizontal surface when the belts are in the contact state, and be put in a state in which the collecting box 71 is inclined with respect to the horizontal surface when the belts are in the separated state.

Incidentally, in this embodiment, the constitution in which the first belt 21 is moved toward and away from the second belt 25 by the contact-and-separation mechanism 610 is used when the first belt 21 or the second belt 25 is exchanged, but in another case, the contact-and-separation mechanism 610 may also be used. For example, in the case where a so-called jam such that the recording material S stagnates in the cooling nip T4 between the first belt 21 and the second belt 25 occurs, the first belt 21 may also be separated from the second belt 25 by using the contact-and-separation mechanism 610. In this case, as described above, the grip portion 67 is positioned on the front side, and thus a user is capable of removing the stagnated recording material S from the recording material cooling device 20, from the front side of the recording material cooling device 20, so that operativity is improved. Incidentally, also in this case, the upper frame 62 is swung relative to the lower frame 63, so that the first belt 21 and the second belt 25 may also be required to be put in the separated state. Accordingly, also in the case where the recording material S stagnated between the first belt 21 and the second belt 25 is removed, the collecting box 71 is swung together with the upper frame 62, whereby the collecting box 71 is in an inclined state relative to the horizontal surface. In this embodiment, a state in which the cooling nip is formed by the first belt 21 and the second belt 25 is a first position of the upper frame 62, and a state in which the first belt 21 is swung relative to the second belt 25 (state in which the first belt 21 is inclined) in the case where the recording material S stagnated in the cooling nip is removed or in the like case is a second position of the upper frame 62. Here, the state in which the cooling nip is formed is a state in which the recording material S is capable of being fed by the recording material cooling device 20.

[Collecting Box]

Next, the collecting box 71 in this embodiment will be described using FIG. 5 to FIG. 6B while making reference to FIG. 3. In the following description, the above-described the other end side (right front side of FIGS. 2 to 6B) with respect to the widthwise direction of the upper frame 62 is also called a "front (surface)" side of the image forming apparatus 100 (recording material cooling device 20), and the above-described one end side with respect to the upper frame 62 is also called a "rear (surface)" side of the image forming apparatus 100 (recording material cooling device 20).

As shown in FIG. 5, the collecting box 71 as a receiving container is provided along a longitudinal direction of the scraper 70 (widthwise direction and rotational axis direction of the first belt 21), and collects the deposited matter removed from the inner peripheral surface of the first belt 21 by the scraper 70. The collecting box 71 in this embodiment includes a wall surface portion 71c outside, with respect to the widthwise direction (longitudinal direction of the scraper 70), a contact region Z when the scraper 70 contacts the first belt 21. As regards the wall surface portion 71c, at least a position thereof positioned on a side downstream of an edge line portion 70a, of the scraper 70 contacting the first belt 21, with respect to the movement direction (arrow Q direction in the figure) of the first belt 21 is positioned on the above-described one end side of the first belt 21. Further, the wall surface portion 71c is provided so that a part thereof positioned on a side upstream of the edge line portion 70a with respect to the movement direction is positioned on the above-described one end side of the first belt 21. This wall surface portion 71c dams the deposited matter accommodated in the collecting box 71 when the collecting box 71 is inclined with the swing of the upper frame 62, and therefore, even when the collecting box 71 is inclined with the swing of the upper frame 62, the wall surface portion 71c is capable of preventing overflow of the deposited matter from the collecting box 71. In this embodiment, in the case where the collecting box 71 accommodates the deposited matter in a predetermined amount, the collecting box 71 is exchanged. In this embodiment, the predetermined amount is an amount of the deposited matter collected in the collecting box 71 in the case where the first belt 21 is rotated in the number of predetermined times (for example, 1,500,000 rotations). Further, timing of the exchange of the collecting box 71 is the same as the timing of the exchange of the first belt 21.

In the case of this embodiment, an amount of the deposited matter collected when the first belt 21 is rotated, for example, 1,500,000 times is a permissible amount of the deposited matter capable of being collected in the case where the recording material cooling device 20 is normally used. For that reason, the wall surface portion 71c is provided so that leakage of the deposited matter can be prevented when the amount of the deposited matter collected in the collecting box 71 is the permissible amount or less even in the case where the upper frame 62 is swung. Thus, in this embodiment, even in the case where the upper frame 62 is swung within a range of normal use when the collecting box 71 collects the deposited matter in the predetermined amount (permissible amount of the deposited matter collectable by the collecting box 71) or less, prevention of overflow of the deposited matter from the collecting box 71 is intended to be achieved. Accordingly, in the outside of the range of normal use, the deposited matter overflows from the collecting box 71 in some cases. Here, the outside of the range of normal use refers to, for example, the case where the deposited matter in an amount exceeding the permissible amount is collected in the collecting box 71 or the case where the upper frame 62 is vigorously swung compared with in the case of the normal use.

In the case of this embodiment, the edge line portion 70a which is a contact portion where the scraper 70 contacts the first belt 21 with respect to the movement direction of the first belt 21 is provided so as to be positioned inside the collecting box 71 with respect to the movement direction (arrow Q direction in FIG. 5) of the first belt 21. That is, the scraper 70 is mounted on the collecting box 71 so that the edge line portion 70a is positioned between an upstream-side wall 70b and a downstream-side wall 70c with respect to the arrow Q direction. In this embodiment, a distance between the upstream-side wall 70b and the downstream-side wall 70c with respect to the arrow Q direction is 20-30 cm.

Further, a depth from an upper end (portion) 71e defining an opening of the collecting box 71 to a bottom 71d is such that the depth is greater on the downstream-side than on the upstream-side with respect to the movement direction (arrow Q direction in FIG. 5) of the first belt 21. That is, the downstream-side wall 70c of the collecting box 71 is higher than the upstream-side wall 70b of the collecting box 71 with respect to the arrow Q direction. In this embodiment, a height of the downstream-side wall 71c with respect to the arrow Q direction is 2-4.5 mm. The collecting box 71 is provided with the opening through the deposited matter containing the abrasion powder scraped off by the scraper 70 is received, and is disposed with a predetermined interval between the upper end 71e defining the opening and the inner peripheral surface of the first belt 21. Here, as shown in FIG. 5, the opening of the collecting box 71 is formed by the upper end 71e connecting upper end portions of the wall surface portions 71b and 71c and the walls 70b and 70c.

Further, inside the collecting box 71, a plurality of partition wall ribs 71a as a plurality of partition wall portions into which an inside space in which the deposited matter is accumulated is divided with respect to the longitudinal direction are formed. In this embodiment, with respect to the longitudinal direction, five partition wall ribs 71a are equidistantly provided, so that the inside space of the collecting box 71 is partitioned into six accommodating chambers each capable of accommodating the deposited matter. Each of these partition wall ribs 71a conforms to the depth of the collecting box 71, and a height thereof from the bottom 71d of the collecting box 71 is higher on the downstream side than on the upstream side with respect to the movement direction (arrow Q direction in FIG. 5) of the first belt 21. Thus, in each of the accommodating chambers partitioned by the partition wall ribs 71a, the deposited matter can be accumulated in a larger amount on the downstream side than on the upstream side with respect to the movement direction (arrow Q direction in FIG. 5) of the first belt 21.

Thus, in the collecting box 71 provided with the opening through which the deposited matter scraped off by the scraper 70 is collected, the plurality of partition wall ribs 71a are provided, so that a collecting amount of the deposited matter in the collecting box 71 can be increased compared with the case where the collecting box 71 is constituted only by the walls 71b and 71c without providing the partition wall ribs 71a. This is because as described above, compared with the case where the deposited matter moving with the rotation of the upper frame 62 is dammed only by the wall surface portion 71c, in the case where the deposited matter is dammed by the wall surface portion 71c and the plurality of partition wall ribs 71a, the collecting amount of the deposited matter until the deposited matter leaks out of the wall surface portion 71c to the rear side when the collecting box 71 is inclined can be increased.

Further, the present inventors conducted experiments in accordance with a condition 1 and a condition 2 by using the above-described collecting box 71 in order to check a belt separation operation and a deposited state of the deposited matter in the collecting box 71. In the condition 1, the recording material cooling device is continuously operated over 8 hours per day and the above-described belt separation is not performed once. The deposited state of the deposited matter in the collecting box 71 in the case where the experiment was conducted in the condition 1 is shown in FIG. 6A. On the other hand, in the condition 2, although the recording material cooling device is continuously operated over 8 hours per day similarly as in the condition 1, different from the condition 1, the above-described belt separation operation was performed at a frequency of about once per 7 days. The deposited state of the deposited matter in the collecting box 71 in the case where the experiment was conducted in the condition 2 is shown in FIG. 6B. The present inventors conducted the experiments in these conditions 1 and 2 are checked the number of days required until the deposited matter leaked out of the collecting box 71.

In the case where the experiment was conducted in the condition 1, the number of days required until the deposited matter leaked out of the collecting box 71 was 111 days. That is, as shown in FIG. 6A, a deposited matter W (thick hatched line in the figure) is deposited in an arc substantially right below the edge line portion 70a which is a region in which the scraper 70 contacts the first belt 21. In the case of the condition 1, the deposited matter W deposits only right below the edge line portion 70a, so that a volume of the collecting box 71 cannot be sufficiently utilized.

On the other hand, in the case where the experiment was conducted in the condition 2, the number of days required until the deposited matter leaked out of the collecting box 71 was 139 days. For example, with a swing operation in which a user raises the upper frame 62 in the case where the user removes the stagnated recording material or in the like case, the collecting box 71 is inclined so that the front-side wall surface portion 71b (the other end side wall surface portion) is positioned above with respect to the direction of gravitation than the rear-side wall surface portion 71c (one end side wall surface portion) is. Further, in an upper viewpoint where the upper frame 62 (FIG. 4A) is raised, the swing is stopped at a predetermined position by a stopper (not shown), but at that time, a certain shock is applied to the collecting box 71. Thus, the collecting box 71 is inclined and the certain shock is applied to the collecting box 71, whereby the deposited matter W accommodated in the shape of the arc as shown in FIG. 6A is broken toward the rear side.

Then, the broken deposited matter is dammed by the wall surface portion 71c and the partition wall ribs 71a and is moved from the upstream side toward the downstream side in the movement direction of the first belt 21 while being leveled as shown in FIG. 6B. Thus, in this embodiment, the downstream W deposited in the arc shape right below the edge line portion 70a is broken, so that the deposited matter W van be accommodated while being shifted to a downstream-side space having a greater depth, i.e., a downstream-side space large in accommodating amount. That is, the deposited matter W is moved toward a base side (fixed side) of the scraper 70, so that a region of the collecting box 71 at a position right below the scraper 70 can be effectively utilized.

After the deposited matter W is put in the state shown in FIG. 6B, when the recording material cooling device 20 is further continuously operated, the deposited matter W starts to deposit again in the neighborhood of the position right below the edge line portion 70a of the scraper 70. Then, with the swing operation in which the upper frame 62 is raise in the case where the user removes the stagnated recording material or in the like case, every inclination of the collecting box 71, the arc of the deposited matter W is broken and is accumulated in each of the accommodating chambers. Further, by the wall surface portion 71c, overflow of the deposited matter W from the collecting box 71 due to a flow of the deposited matter W toward the rear side is prevented in the case where the collecting box 71 is inclined. Further, by partitioning the inside space of the collecting box 71 into the plurality of accommodating chambers with the partition wall ribs 71a, in the case where the collecting box 71 is inclined, the deposited matter W in a larger amount can be accommodated while preventing the overflow of the deposited matter W from the collecting box 71 due to the flow of the deposited matter W toward the rear side. Thus, the arc of the deposited matter W is broken by inclining the collecting box 71, so that it is possible to suppress the overflow of the deposited matter W from the collecting box 71 due to deposition of the deposited matter W only at a part of the collecting box 71.

As described above, the collecting box 71 is swung together with the upper frame 62, whereby the collecting box 71 is in a state in which the collecting box 71 is inclined with respect to the horizontal surface when the first belt 21 and the second belt 25 are in the separated state. Further, the collecting box 71 includes the wall surface portion 71c outside the contact region Z where the scraper 71 contacts the first belt 21 with respect to the widthwise direction. Further inside the collecting box 71, the plurality of partition wall ribs 71a by which the inside space for accumulating the deposited matter W containing the abrasion powder is divided into a plurality of spaces are formed. By this, when the collecting box 71 is inclined with the swing operation of the upper frame 62 by the user in the case where the stagnated recording material is removed by the user or in the like case, the overflow of the deposited matter W, moving toward the rotation center side of the upper frame 62 in the collecting box 71, from the rotation center side of the collecting box 71 can be suppressed. By this, contamination of the inside of the recording material cooling device 20 with the deposited matter W due to the flow of the deposited matter W toward the inside of the recording material cooling device 20 can be suppressed. Further, the deposited matter in the collecting box 71 is dispersed and easily extended over the inside of the collecting box 71, so that the accommodating space of the collecting box 71 can be efficiently utilized. Then, the collecting box 71 is capable of accommodating the deposited matter in a larger amount, with the result that a frequency of an operation of removing the deposited matter from the collecting box 71 by the operator can be reduced.

Incidentally, the collecting box 71 may be provided so as to be capable of being inserted into and extracted from the upper frame 62 on the other end side (left side of FIGS. 4A and 4B9 with respect to the widthwise direction. Further, only in the case where the first belt 21 and the second belt 25 are in the contact state therebetween as shown in FIG. 4A, it is preferable that the collecting box 71 can be inserted into and extracted from the upper frame 62 by the operator. That is, in the case of the contact state, the collecting box 71 is dismounted from the upper frame 62 in the state in which the collecting box 71 is not inclined, so that during dismounting of the collecting box 71, the deposited matter is not readily dropped from the collecting box 71 and therefore, such a case is advantageous.

Second Embodiment

Figure 7A:
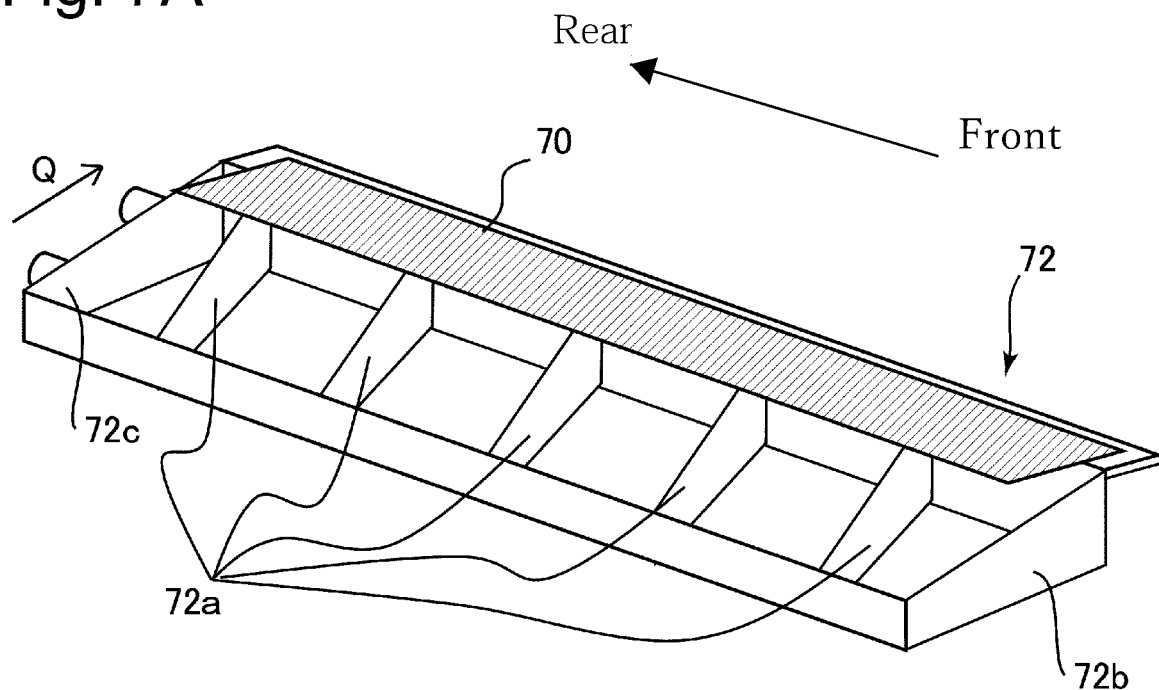
FIG. 7A is a perspective view showing a collecting box in a second embodiment.

A collecting box in a second embodiment will be described using FIGS. 7A and 7B. As shown in FIG. 7A, a collecting box 72 in the second embodiment includes, similarly as the collecting box 71 (FIG. 5) in the first embodiment, wall surface portions 72b and 72c outside the contact region Z where the scraper 70 contacts the first belt 21 with respect to the widthwise direction. Inside the collecting box 72, a plurality of partition wall ribs 72a as partition wall portions are formed, so that an inside space of the collecting box 72 is divided into six accommodating chambers. These partition wall ribs 72a are formed so that a height thereof from a bottom 72d of the collecting box 72 is higher on a downstream side than on an upstream side.

Figure 7B:
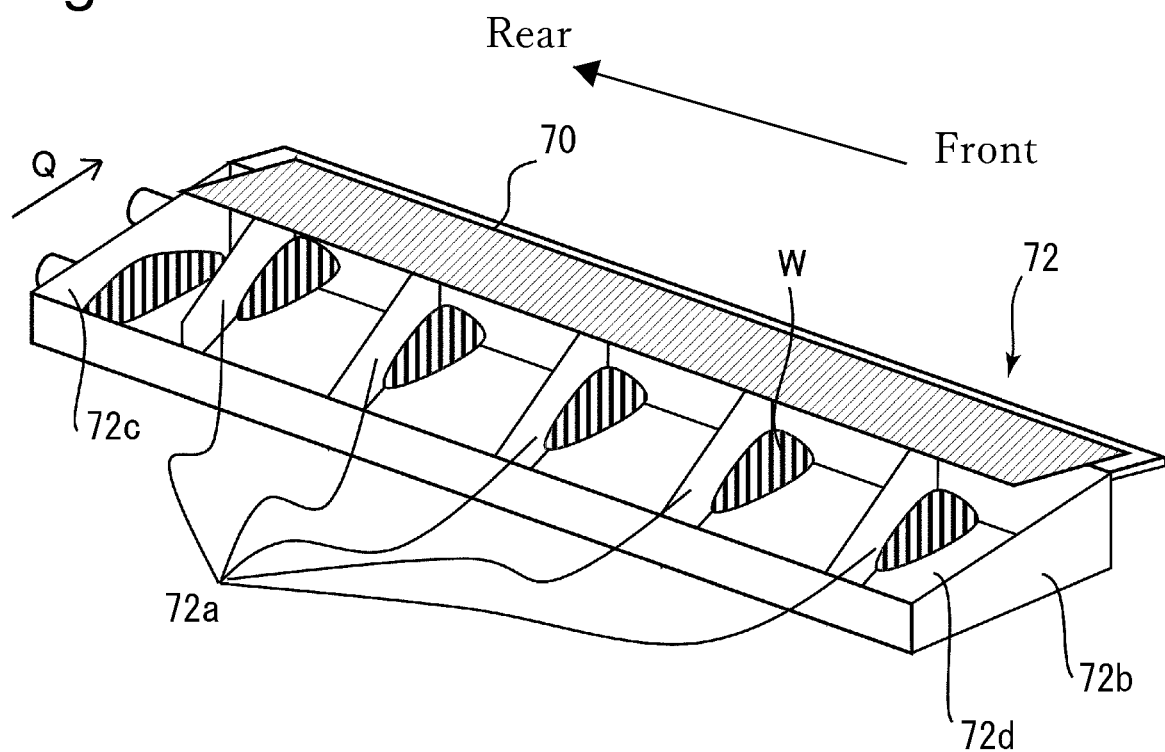
FIG. 7B is a perspective view showing a deposited state of a deposited matter in the collecting box after a swing.

Further, different from the collecting box 71 (FIG. 5), the collecting box 72 is formed so that the partition wall ribs 72a are obliquely formed in a state in which a downstream end side thereof with respect to the movement direction of the first belt 21 is closer to the swing center than an upstream end side thereof is, as seen in the movement direction (arrow Q direction in FIGS. 7A and 7B). With the swing operation of raising the upper frame 62 by the operator, the collecting box 72 is also inclined. Then, as shown in FIG. 7B, the deposited matter W accommodated in the shape of arc is broken toward the rear side, and the broken deposited matter W is dammed by the partition wall ribs 72a. As described above, the partition wall ribs 72a are obliquely formed. For that reason, the deposited matter W is liable to enter a region right below the scraper 70. By this, compared with the case of the first embodiment, the region right below the scraper 70 is more effectively utilized, so that the deposited matter W can be accumulated in the collecting box 72.

In this second embodiment, when the number of days until the deposited matter W leaked out of the collecting box 72 was checked, the number of days was 187 days. This is longer than 139 days as a result of the experiment (condition 2) in the first embodiment. That is, compared with the case of the first embodiment, in the case of the second embodiment, the accommodating space in the collecting box 72 can be efficiently utilized, so that a frequency of removing the deposited matter W from the collecting box 72 by the operator can be further reduced.

Other Embodiments

Incidentally, in the above-described embodiments, the case where the upper frame 62 is swung upward with respect to the direction of gravitation was described as an example, but the present invention is not limited thereto, but the case where the lower frame 63 is swung downward relative to the upper frame 62 with a swing shaft 62a as a swing center may also be employed. In that case, for example, in FIG. 7A, the direction of the inclination of the partition wall ribs 72a is reversed. By employing such a constitution, with the swing of the lower frame 63, the collecting box 72 is inclined so that a side where the wall surface portion 72c is disposed is moved downward in the direction of gravitation. Correspondingly, the deposited matter W accommodated in the arc shape is broken toward the front side, and the broken deposited matter W is dammed by the partition wall ribs 72a formed obliquely and thus can enter the region right below the scraper 70.

Figure 8:
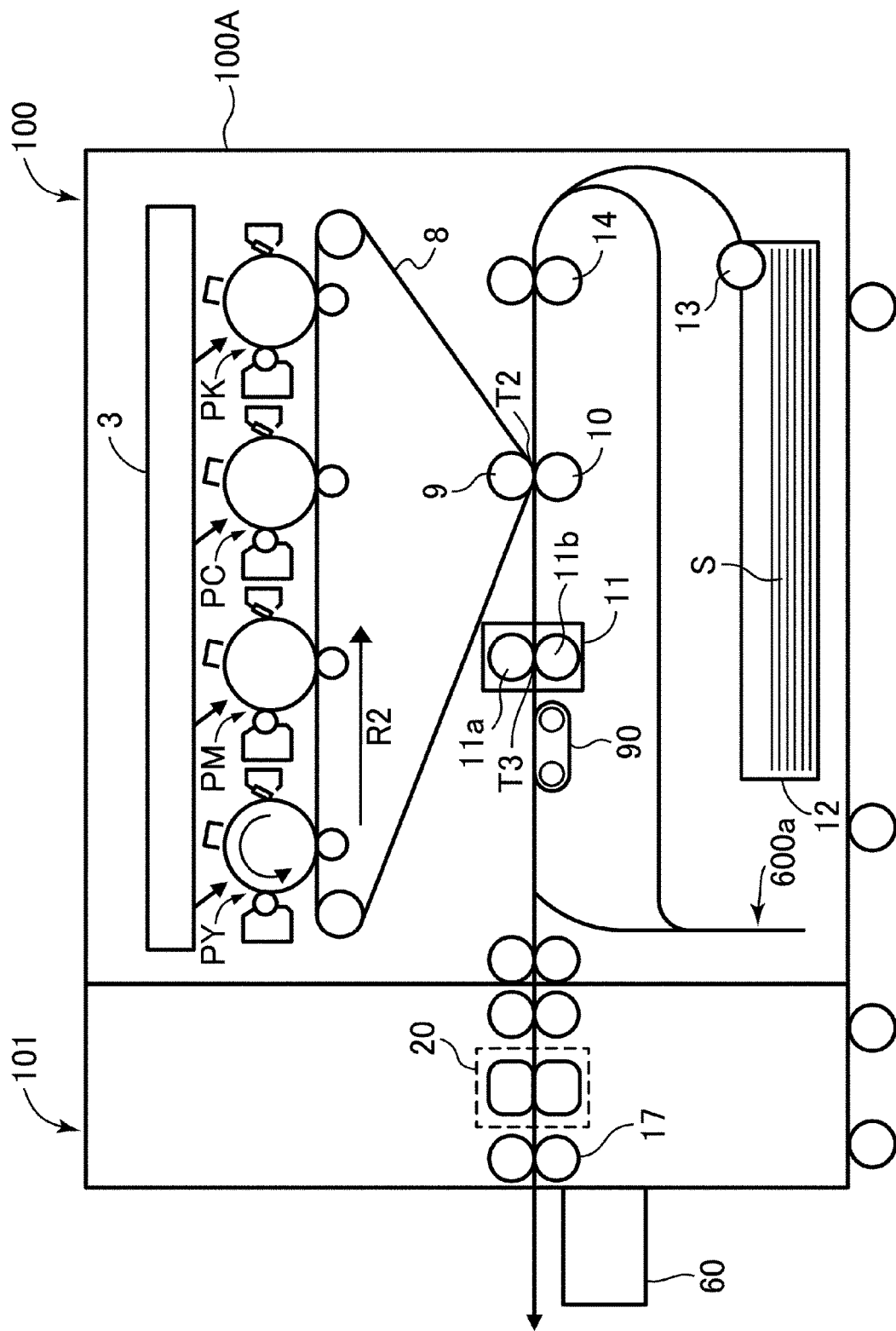
FIG. 8 is a schematic view showing an embodiment in which a recording material cooling device is provided outside an image forming apparatus.

In the above-described embodiments, the case where the recording material cooling device 20 was provided in the apparatus main assembly 100A of the image forming apparatus 100 was described as an example (FIG. 1), but the present invention is not limited thereto. For example, the recording material cooling device 20 may also be provided outside the apparatus main assembly 100A. FIG. 8 shows an example in which the recording material cooling device 20 is provided outside the apparatus main assembly 100A.

As shown in FIG. 8, to the apparatus main assembly 100A, an external cooling unit 101 as an external cooling device is connected. The external cooling unit 101 is constituted as one of peripheral devices (called option units or the like) capable of being retrofitted to the apparatus main assembly 100A in order to extend the function of the image forming apparatus 100, so as to be connectable to the image forming apparatus 100. The external cooling unit 101 is provided for lowering a temperature of the recording material S, high compared with the temperature before fixing, to a predetermined temperature by cooling the recording material S discharged from the apparatus main assembly 100A. The external cooling unit 101 includes the above-described recording material cooling device 20 for cooling the recording material S.

The recording material S cooled by the external cooling unit 101 is discharged from the external cooling unit 101 by a discharging roller pair 17 and is stacked on a stacking unit 60. The stacking unit 60 is provided so as to be mountable to and dismountable from the external cooling unit 101 or the image forming apparatus 100. That is, in the case where the external cooling unit 101 is not connected to the image forming apparatus 100, the stacking unit 60 is mounted to the image forming apparatus 100 (FIG. 1). Further, when the external cooling unit 101 is connected to the image forming apparatus 100, the stacking unit 60 is dismounted from the image forming apparatus 100 and then is mounted to the external cooling unit 101.

Incidentally, as the peripheral machine, a plurality of external cooling units 101 may also be connected. By increasing the number of external cooling units 101 to be connected, the operator is capable of easily improving cooling power of the recording material S in the already-installed image forming apparatus 100.

Figure 9A:
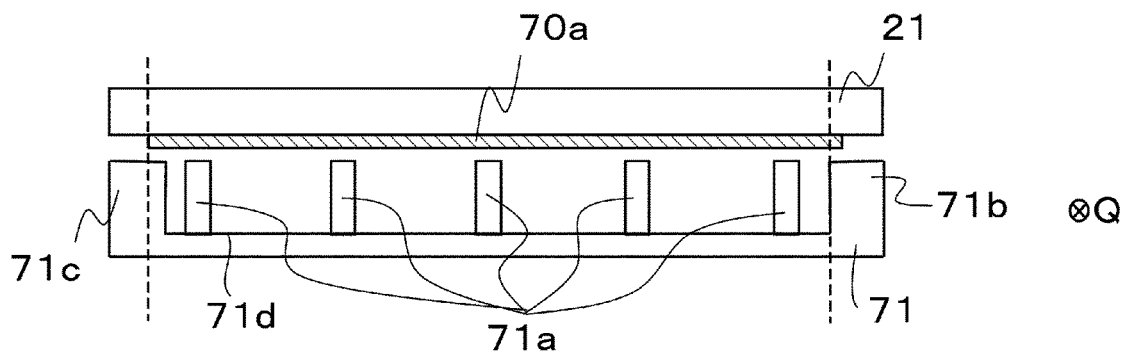
FIG. 9A is a sectional view of a collecting box out at a position of an edge line portion thereof along a thickness direction of a first belt.
Figure 9B:
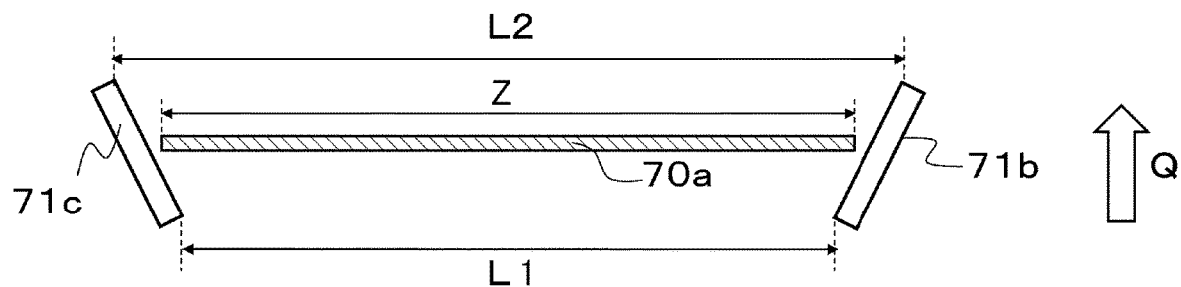
FIG. 9B is a plan view showing an example of wall surface portions as seen from above with respect to a vertical direction.
Figure 9C:
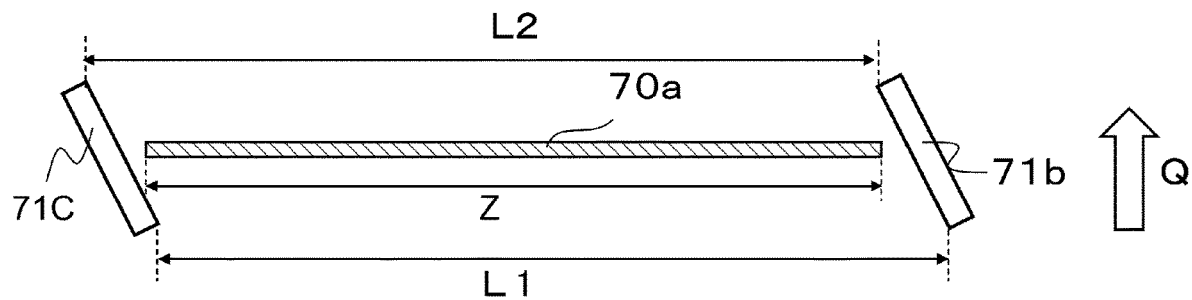
FIG. 9C is a plan view showing another example of wall surface portions as seen from above with respect to the vertical direction.

Further, in the above-described embodiments, the constitution in which the entire wall surface portion 71c is disposed outside the contact region Z where the scraper 70 contacts the first belt 21 was employed, but when the deposited matter W scraped off by the scraper 70 can be collected, another constitution may also be employed. For example, a constitution in which the wall surface portion 71c is positioned inside the contact region Z of the scraper 70 may also be employed. FIGS. 9A to 9C show embodiments in which a part of each of the wall surface portion 71b (the other end side wall surface portion) and the wall surface portion 71c (one end side wall surface portion) overlaps with the contact region Z of the scraper 70. FIG. 9A is a sectional view of the first belt 21 and the collecting box 71 cut along a thickness direction at a position of the edge line portion 70a which is a contact position between the first belt 21 and the scraper 70 as seen from the upstream side of the first belt 21 with respect to the movement direction Q. Each of FIGS. 9B and 9C is a plan view of the collecting box 71 as seen from above with respect to the vertical direction and illustrates a positional relationship between the edge line portion 70a of the scraper 70 and the wall surface portions 71b and 71c. In FIGS. 9B and 9C, the partition wall ribs 71a are omitted from illustration.

As shown in FIGS. 9A and 9B, at the position of the edge line portion 70a showing a region where the scraper 70 contacts the first belt 21, a part of each of the wall surface portions 71b and 71b positioned outside the collecting box 71 with respect to the longitudinal direction of the collecting box 71. Specifically, as shown in FIG. 9B, as regards the wall surface portion 71c, at least a side thereof downstream of the edge line portion 70a with respect to the movement direction (arrow Q direction in the figure) of the first belt 21 is positioned on one end side of the first belt 21 with respect to the widthwise direction than the contact region Z of the edge line portion 70a is. Further, the wall surface portion 71c is obliquely provided so as to overlap with a part of the contact region Z with respect to the rotational axis direction on a side upstream of the edge line portion 70a with respect to the movement direction. On the other hand, as regards the wall surface portion 71b, a side thereof downstream of the edge line portion 70a with respect to the movement direction is positioned on the other end side of the first belt 21 with respect to the rotational axis direction than the contact region Z is. Further, the wall surface portion 71b is obliquely provided so as to overlap with a part of the contact region Z with respect to the rotational axis direction on a side upstream of the edge line portion 70a with respect to the movement direction. In this embodiment, with respect to the movement direction of the first belt 21, an interval L between an upstream end of the wall surface portion 71b and an upstream end of the wall surface portion 71c is shorter than the contact region Z with respect to the widthwise direction. Further, with respect to the movement direction of the first belt 21, an interval L2 between a downstream end of the wall surface portion 71b and a downstream end of the wall surface portion 71c is longer than the contact region Z with respect to the widthwise direction. Even in such a constitution, at a position where the scraper 70 contacts the first belt 21, the wall surface portions 71b and 71c are positioned outside the edge line portion 70a, and therefore, the deposited matter W scraped off by the scraper 70 can be collected. Incidentally, the wall surface portion 71b is inclined so that an upstream end portion thereof is positioned in a direction away from the edge line portion 70a with respect to the widthwise direction and so that a downstream end portion thereof is positioned in a direction approaching the edge line portion 70a with respect to the widthwise direction. By this, on a side downstream of the edge line portion 70a with respect to the movement direction, a region in which the deposited matter W is collected can be enlarged.

Incidentally, in FIG. 9B, the constitution in which the wall surface portion 71b and the wall surface portion 71c are inclined in different directions from each other was employed, but as shown in FIG. 9C, a constitution in which these wall surface portions 71b and 71c are inclined in the same direction may also be employed. That is, as regards the wall surface portion 71b, a side thereof upstream of the edge line portion 70a with respect to the movement direction is positioned on the sinks other end side of the first belt 21 with respect to the rotational axis direction than the contact region Z is. The wall surface portion 71b overlaps with the contact region Z with respect to the rotational axis direction on a side downstream of the edge line portion 70a with respect to the widthwise direction. Thus, in the case of this embodiment, an upstream end portion of the wall surface portion 71c with respect to the movement direction is positioned inside the edge line portion 70a with respect to the widthwise direction, and a downstream end portion of the wall surface portion 71b with respect to the movement direction is positioned inside the edge line portion 70a with respect to the widthwise direction. Even in such a constitution, at the position where the scraper 70 contacts the first belt 21, the wall surface portions 71b and 71c are positioned outside the edge line portion 70a, and therefore, the deposited matter W scraped off by the scraper 70 can be collected.

Incidentally, in the above-described embodiments, as an example of the removing member, the scraper 70 was described, but other removing members such as a fur brush and non-woven fabric may also be used when these removing members are capable of removing the deposited matter deposited on the inner peripheral surface of the belt.

According to the present invention, in the recording material cooling device of the belt cooling type in which the mechanism for swinging the belt relative to the feeding member for nipping and feeding the recording material in cooperation with the belt, it is possible to suppress overflow of the deposited matter from the case (collecting box) in the case where the belt is swung.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2020-014114 filed on Jan. 30, 2020 and 2020-187429 filed on Nov. 10, 2020 which is hereby incorporated by reference herein in its entirety.

What is claimed is:

1. A recording material cooling device for cooling a recording material passed through a fixing device for fixing a toner image on the recording material by heating, said recording material cooling device comprising:
   a belt:
   a plurality of rollers configured to stretch said belt;
   a cooling member configured to cool said belt in contact with an inner peripheral surface of said belt;
   a feeding member contacting an outer peripheral surface of said belt and configured to form a nip, in which the recording material is nipped and fed, in cooperation with said belt;
   a removing member configured to remove a deposited matter deposited on the inner peripheral surface of said belt;
   a receiving container provided with an opening configured to receive the deposited matter removed by said removing member;
   a holding member configured to hold said rollers, said cooling member and said receiving container; and
   a supporting member configured to swingably support said holding member so that said holding member is swingable between a first position where said belt and said feeding member contact each other and a second position where said belt is spaced from said feeding member, wherein said supporting member supports said holding member so that a swing center is positioned on one end side with respect to a rotational axis direction of said rollers, wherein said receiving container swings with swinging of said holding member from the first position to the second position, and includes a wall surface portion provided on one end side with respect to the rotational axis direction of said rollers, said wall surface portion being configured to prevent overflow of the deposited matter received through said opening with the swinging of said receiving container, and wherein a part of said wall surface portion positioned on a side upstream of a contact portion of said removing member, contacting said belt, with respect to a movement direction of said belt is provided obliquely so as to overlap with a part of a contact region of said removing member.

2. A recording material cooling device according to claim 1, wherein at least a part of said wall surface portion positioned on a side downstream of a contact portion of said removing member, contacting said belt, with respect to a movement direction of said belt is provided so as to be positioned on one end side of said belt with respect to the rotational axis direction.

3. A recording material cooling device according to claim 1, wherein a part of said wall surface portion positioned on a side upstream of a contact portion of said removing member, contacting said belt, with respect to a movement direction of said belt is provided so as to be positioned on one end side of said belt with respect to the rotational axis direction.

4. A recording material cooling device according to claim 1, wherein said receiving container includes the other end side wall surface portion positioned on the other end side of said belt with respect to the rotational axis direction, and wherein said other end side wall surface portion includes at least a part thereof positioned on a side downstream of a contact portion of said removing member, contacting said belt, with respect to a movement direction of said belt is provided so as to be positioned on said other end side of said belt with respect to the rotational axis direction.

5. A recording material cooling device according to claim 1, wherein said removing member is held by said receiving container.

6. A recording material cooling device according to claim 1, wherein said cooling member is a heat dissipation plate configured to dissipate heat in contact with said belt.

7. A recording material cooling device according to claim 1, wherein said feeding member is a belt shaped member.

8. A recording material cooling device according to claim 1, wherein the first position is a position where the nip in which the recording material is fed by said belt and said feeding member, and wherein the second position is a position where the nip between said belt and said feeding member is released.

9. A recording material cooling device according to claim 1, wherein one end side of said recording material cooling device with respect to the rotational axis direction is a rear side of said recording material cooling device, and wherein the other end side of said recording material cooling device with respect to the rotational axis direction is a front side of said recording material cooling device.

10. An image forming apparatus comprising:
an image forming unit configured to form a toner image on a recording material;
a fixing device configured to fix the toner image, formed by said image forming unit, by heating; and
a recording material cooling device according to claim 1, which is provided on a side downstream of said fixing device with respect to a recording material feeding direction and which is configured to cool the recording material passed through said fixing device.

11. A recording material cooling device for cooling a recording material passed through a fixing device for fixing a toner image on the recording material by heating, said recording material cooling device comprising:
a belt;
a plurality of rollers configured to stretch said belt;
a cooling member configured to cool said belt in contact with an inner peripheral surface of said belt;
a feeding member contacting an outer peripheral surface of said belt and configured to form a nip, in which the recording material is nipped and fed, in cooperation with said belt;
a removing member configured to remove a deposited matter deposited on the inner peripheral surface of said belt;
a receiving container provided with an opening configured to receive the deposited matter removed by said removing member;
a holding member configured to hold said rollers, said cooling member and said receiving container; and
a supporting member configured to swingably support said holding member so that said holding member is swingable between a first position where said belt and said feeding member contact each other and a second position where said belt is spaced from said feeding member, wherein said supporting member supports said holding member so that a swing center is positioned on one end side with respect to a rotational axis direction of said rollers, wherein said receiving container swings with swinging of said holding member from the first position to the second position, and includes a wall surface portion provided on one end side with respect to the rotational axis direction of said rollers, said wall surface portion being configured to prevent overflow of the deposited matter received through said opening with the swinging of said receiving container, wherein said receiving container includes the other end side wall surface portion positioned on the other end side of said belt with respect to the rotational axis direction, wherein said other end side wall surface portion includes at least a part thereof positioned on a side downstream of a contact portion of said removing member, contacting said belt, with respect to a movement direction of said belt is provided so as to be positioned on said other end side of said belt with respect to the rotational axis direction, and wherein said other end side wall surface portion is provided obliquely so as to overlap with a part of said contact region with respect to the rotational axis direction on a side upstream of said contact portion with respect to the movement direction.

12. A recording material cooling device for cooling a recording material passed through a fixing device for fixing a toner image on the recording material by heating, said recording material cooling device comprising:
- a belt;
- a plurality of rollers configured to stretch said belt;
- a cooling member configured to cool said belt in contact with an inner peripheral surface of said belt;
- a feeding member contacting an outer peripheral surface of said belt and configured to form a nip, in which the recording material is nipped and fed, in cooperation with said belt;
- a removing member configured to remove a deposited matter deposited on the inner peripheral surface of said belt;
- a receiving container provided with an opening configured to receive the deposited matter removed by said removing member;
- a holding member configured to hold said rollers, said cooling member and said receiving container; and
- a supporting member configured to swingably support said holding member so that said holding member is swingable between a first position where said belt and said feeding member contact each other and a second position where said belt is spaced from said feeding member, wherein said supporting member supports said holding member so that a swing center is positioned on one end side with respect to a rotational axis direction of said rollers,
- wherein said receiving container swings with swinging of said holding member from the first position to the second position, and includes a wall surface portion provided on one end side with respect to the rotational axis direction of said rollers, said wall surface portion being configured to prevent overflow of the deposited matter received through said opening with the swinging of said receiving container,
- wherein said receiving container includes the other end side wall surface portion positioned on the other end side of said belt with respect to the rotational axis direction,
- wherein said other end side wall surface portion includes at least a part thereof positioned on a side downstream of a contact portion of said removing member, contacting said belt, with respect to a movement direction of said belt is provided so as to be positioned on said other end side of said belt with respect to the rotational axis direction, and
- wherein said other end side wall surface portion is provided obliquely so as to overlap with a part of said contact region with respect to the rotational axis direction on a side downstream of said contact portion with respect to the movement direction.

13. A recording material cooling device for cooling a recording material passed through a fixing device for fixing a toner image on the recording material by heating, said recording material cooling device comprising:
- a belt;
- a plurality of rollers configured to stretch said belt;
- a cooling member configured to cool said belt in contact with an inner peripheral surface of said belt;
- a feeding member contacting an outer peripheral surface of said belt and configured to form a nip, in which the recording material is nipped and fed, in cooperation with said belt;
- a removing member configured to remove a deposited matter deposited on the inner peripheral surface of said belt;
- a receiving container provided with an opening configured to receive the deposited matter removed by said removing member;
- a holding member configured to hold said rollers, said cooling member and said receiving container; and
- a supporting member configured to swingably support said holding member so that said holding member is swingable between a first position where said belt and said feeding member contact each other and a second position where said belt is spaced from said feeding member, wherein said supporting member supports said holding member so that a swing center is positioned on one end side with respect to a rotational axis direction of said rollers,
- wherein said receiving container swings with swinging of said holding member from the first position to the second position, and includes a wall surface portion provided on one end side with respect to the rotational axis direction of said rollers, said wall surface portion being configured to prevent overflow of the deposited matter received through said opening with the swinging of said receiving container, and
- wherein said receiving container includes at least one partition wall portion partitioning an inside thereof into a plurality of accommodating chambers with respect to the rotational axis direction.

14. A recording material cooling device according to claim 13, wherein said receiving container is formed so as to be deeper on a downstream side than on an upstream side with respect to a movement direction of said belt, and
- wherein said partition wall portion has a height from a bottom of said receiving container such that the height is higher on the downstream side than on the upstream side with respect to the movement direction.

15. A recording material cooling device according to claim 13, wherein said partition wall portion is formed obliquely so that a downstream end side thereof is closer to the swing center than an upstream end side thereof.

* * * * *